(12) United States Patent
Yoakum et al.

(10) Patent No.: US 8,301,447 B2
(45) Date of Patent: Oct. 30, 2012

(54) ASSOCIATING SOURCE INFORMATION WITH PHONETIC INDICES

(75) Inventors: John H. Yoakum, Cary, NC (US); Stephen Whynot, McKinley, TX (US)

(73) Assignee: Avaya Inc., Basking Ridge, NJ (US)

( * ) Notice: Subject to any disclaimer, the term of this patent is extended or adjusted under 35 U.S.C. 154(b) by 1055 days.

(21) Appl. No.: 12/249,451

(22) Filed: Oct. 10, 2008

(65) Prior Publication Data

US 2010/0094630 A1    Apr. 15, 2010

(51) Int. Cl.
    *G10L 15/04* (2006.01)
(52) U.S. Cl. ........ 704/254; 704/220; 704/265; 704/268; 704/262; 434/185; 434/156; 379/88.01
(58) Field of Classification Search ............... 704/260, 704/254, 262, 256, 258, 9, 267, 220, 265, 704/2, 268, 264, 257, 211; 434/185, 156, 434/169, 118; 379/88.01
See application file for complete search history.

(56) References Cited

U.S. PATENT DOCUMENTS

| | | | | |
|---|---|---|---|---|
| 5,930,755 | A * | 7/1999 | Cecys | 704/260 |
| 6,073,094 | A * | 6/2000 | Chang et al. | 704/223 |
| 6,163,769 | A * | 12/2000 | Acero et al. | 704/260 |
| 7,263,484 | B1 | 8/2007 | Cardillo et al. | |
| 7,509,258 | B1 * | 3/2009 | Roy | 704/256 |
| 7,668,718 | B2 * | 2/2010 | Kahn et al. | 704/270 |
| 2002/0040296 | A1 * | 4/2002 | Kienappel | 704/220 |
| 2002/0052870 | A1 * | 5/2002 | Charlesworth et al. | 707/3 |
| 2002/0080927 | A1 * | 6/2002 | Uppaluru | 379/88.01 |
| 2003/0125945 | A1 * | 7/2003 | Doyle | 704/246 |
| 2003/0125954 | A1 | 7/2003 | Bradley et al. | |
| 2004/0111266 | A1 * | 6/2004 | Coorman et al. | 704/260 |
| 2004/0111271 | A1 | 6/2004 | Tischer | |
| 2004/0215449 | A1 * | 10/2004 | Roy | 704/211 |
| 2005/0159953 | A1 | 7/2005 | Seide et al. | |
| 2006/0149558 | A1 * | 7/2006 | Kahn et al. | 704/278 |
| 2006/0206324 | A1 | 9/2006 | Skilling et al. | |
| 2007/0203702 | A1 * | 8/2007 | Hirose et al. | 704/256 |
| 2008/0071542 | A1 * | 3/2008 | Yu | 704/270 |
| 2008/0082341 | A1 | 4/2008 | Blair | |
| 2008/0162125 | A1 | 7/2008 | Ma et al. | |
| 2008/0270138 | A1 * | 10/2008 | Knight et al. | 704/260 |
| 2009/0043581 | A1 * | 2/2009 | Abbott et al. | 704/254 |

OTHER PUBLICATIONS

International Search Report for PCT/IB2009/007074, mailed Feb. 24, 2010.

* cited by examiner

*Primary Examiner* — Vijay B Chawan
(74) *Attorney, Agent, or Firm* — Withrow & Terranova, PLLC

(57) ABSTRACT

The present invention relates to creating a phonetic index of phonemes from an audio segment that includes speech content from multiple sources. The phonemes in the phonetic index are directly or indirectly associated with the corresponding source of the speech from which the phonemes were derived. By associating the phonemes with a corresponding source, the phonetic index of speech content from multiple sources may be searched based on phonetic content as well as the corresponding source.

31 Claims, 14 Drawing Sheets

TIME REFERENCE

ASSOCIATING SOURCE INFORMATION WITH PHONETIC INDICES

FIELD OF THE INVENTION

The present invention relates to phonetic searching, and in particular to associating source information with phonetic indices.

BACKGROUND OF THE INVENTION

A vast portion of modern communications is provided through written text or speech. In many instances, such text and speech are captured in electronic form and stored for future reference. Given the volume of these communications, large libraries of text and audio-based communications are being amassed and efforts are being made to make these libraries more accessible. Although there is significant benefit gained from thoughtful organization, contextual searching is becoming a necessary supplement, if not a replacement, for traditional organizing techniques. Most document management systems for written documents allow keyword searching throughout any number of databases, regardless of how the documents are organized, to allow users to electronically sift through volumes of documents in an effective and efficient manner.

Text-based documents lend themselves well to electronic searching because the content is easily characterized, understood, and searched. In short, the words of a document are well defined and easily searched. However, speech-based media, such as speech recordings, dictation, telephone calls, multi-party conference calls, music, and the like have traditionally been more difficult to analyze from a content perspective than text-based documents. Most speech-based media is characterized in general and organized and searched accordingly. The specific speech content is generally not known with any specificity, unless human or automated transcription is employed to provide an associated text-based document. Human transcription has proven time-consuming and expensive.

Over the past decade, significant efforts have been made to improve automated speech recognition. Unfortunately, most speech recognition techniques rely on creating large vocabularies of words, which are created based on linguistic modeling for cross-sections of the specific population in which the speech recognition system will be used. In essence, the vocabularies are filled with the many thousands of words that may be uttered during speech. Although such speech recognition has improved, the improvements have been incremental and remain error prone.

An evolving speech processing technology that shows significant promise is based on phonetics. In essence, speech is parsed into a series of discrete human sounds called phonemes. Phonemes are the smallest units of human speech, and most languages only have 30 to 40 phonemes. From this relatively small group of phonemes, all speech can be accurately defined. The series of phonemes created by this parsing process is readily searchable and referred to in general as a phonetic index of the speech. To search for the occurrence of a given term in the speech, the term is first transformed into its phonetic equivalent, which is provided in the form of a string of phonemes. The phonetic index is processed to identify whether the string of phonemes occurs within the phonetic index. If the string of phonemes for the search term occurs in the phonetic index, then the term occurs in the speech. If the phonetic index is time aligned with the speech, the location of the string of phonemes in the phonetic index will correspond to the location of the term in the speech. Notably, phonetic-based speech processing and searching techniques tend to be less complicated and more accurate than the traditional word-based speech recognition techniques. Further, the use of phonemes mitigates the impact of dialects, slang, and other language variations that make identifying a specific word difficult, but have much less impact on each individual phoneme that makes up the same word.

One drawback of phonetic-based speech processing is the ability to distinguish between speakers in multi-party speech, such as that found in telephone or conference calls. Although a particular term may be identified, there is no efficient and automated way to identify the speaker who uttered the term. The ability to associate portions of speech with the respective speakers in multi-party speech would add another dimension in the ability to process and analyze multi-party speech. As such, there is a need for an efficient and effective technique to identify and associate the source of speech in multi-party speech with the corresponding phonemes in a phonetic index that is derived from the multi-party speech.

SUMMARY OF THE INVENTION

The present invention relates to creating a phonetic index of phonemes from an audio segment that includes speech content from multiple sources. The phonemes in the phonetic index are directly or indirectly associated with the corresponding source of the speech from which the phonemes were derived. By associating the phonemes with a corresponding source, the phonetic index of speech content from multiple sources may be searched based on phonetic content as well as the corresponding source. In one embodiment, the audio segment is processed to identify phonemes for each unit of speech in the audio segment. A phonetic index of the phonemes is generated for the audio segment, wherein each phonetic entry in the phonetic index identifies a phoneme that is associated with a corresponding unit of speech in the audio segment. Next, each of the multiple sources is associated with corresponding phonetic entries in the phonetic index, wherein a source associated with a given phonetic entry corresponds to the source of the unit of speech from which the phoneme for the given phonetic entry was generated. Various techniques may be employed to associate the phonemes with their sources; however, once associated, the phonetic index may be searched based on phonetic content and source criteria.

Such searches may entail searching the phonetic index based on phonetic content criteria to identify a source associated with the phonetic content, searching the phonetic index based on the phonetic content criteria as well as source criteria to identify a matching location in the phonetic index or corresponding audio segment, and the like. Accordingly, the source information that is associated with the phonetic index may be useful as a search criterion or a search result. In one embodiment, a phonetic index and any source information directly or indirectly associated therewith may be searched as follows.

Initially, content criteria bearing on the desired phonetic content and source criteria bearing on the desired source are obtained via an appropriate search query. The content criteria query may include keywords, phoneme strings, or any combination thereof alone or in the form of a Boolean function. If one or more keywords are used, each keyword is broken into its phonetic equivalent, which will provide a string of phonemes. Accordingly, the content criteria either is or is converted into phonetic search criteria comprising one or more strings of phonemes, which may be associated with one or more Boolean operators. The phonetic index and associated source information are then searched based on the phonetic content criteria and the source criteria to identify portions of the phonetic index that match the phonetic search criteria and correspond to the source or sources identified in the source criteria. Depending on the application, various actions may be taken in response to identifying those portions of the phonetic index that match the phonetic search criteria and correspond to the source or sources identified by the source criteria. Further, such processing and searching may be provided on existing media files or streaming media that has speech content from one or more parties.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIGS. 3-10 illustrate different techniques for generating a phonetic index and associating source information with the phonetic index according to different embodiments of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
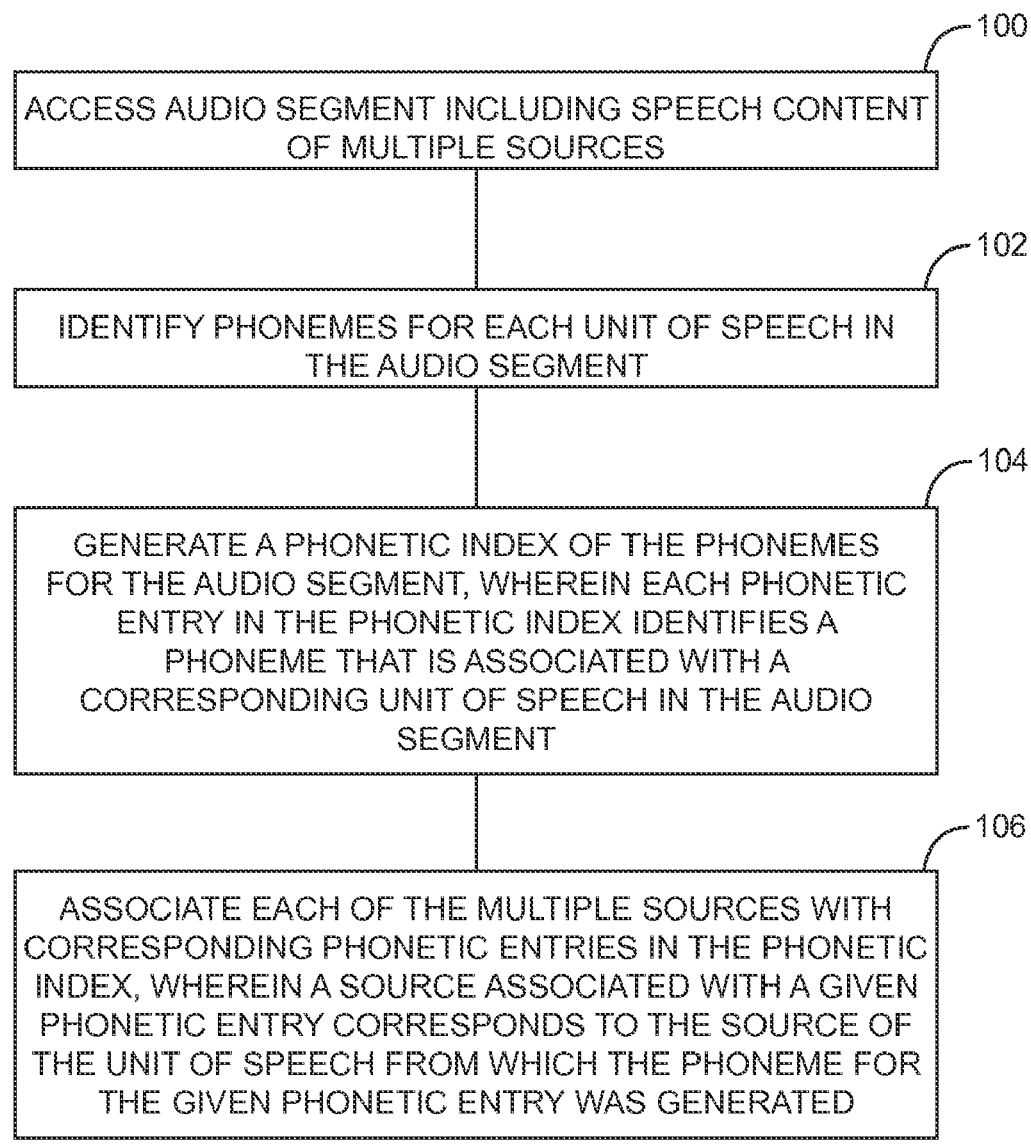
FIG. 1 is a flow diagram illustrating an exemplary process for generating a phonetic index and associating source information with the phonetic index according to one embodiment of the present invention.

The present invention relates to creating a phonetic index of phonemes from an audio segment that includes speech content from multiple sources. The phonemes in the phonetic index are directly or indirectly associated with the corresponding source of the speech from which the phonemes were derived. By associating the phonemes with a corresponding source, the phonetic index of speech content from multiple sources may be searched based on phonetic content as well as the corresponding source. With reference to FIG. 1, an overview is provided of an exemplary process for generating a phonetic index for an audio segment that includes speech content from multiple sources, and associating sources with the corresponding phonemes, according to one embodiment of the present invention.

Initially, an audio segment including speech content from multiple sources is accessed for processing (Step 100). The audio segment may be provided in any type of media item, such as a media stream or stored media file that includes speech from two or more known sources. The media item may include graphics, images, or video in addition to the audio segment. The audio segment is then parsed to identify phonemes for each unit of speech in the audio segment (Step 102). The result of such processing is a sequence of phonemes, which represents the phonetic content of the audio segment. Based on this sequence of phonemes, a phonetic index of the phonemes is generated for the audio segment, wherein each phonetic entry in the phonetic index identifies a phoneme that is associated with a corresponding unit of speech in the audio segment (Step 104). Next, each of the multiple sources is associated with corresponding phonetic entries in the phonetic index, wherein a source associated with a given phonetic entry corresponds to the source of the unit of speech from which the phoneme for the given phonetic entry was generated (Step 106). Various techniques may be employed to associate the phonemes with their sources; however, once associated, the phonetic index may be searched based on phonetic content and source criteria.

Figure 2:
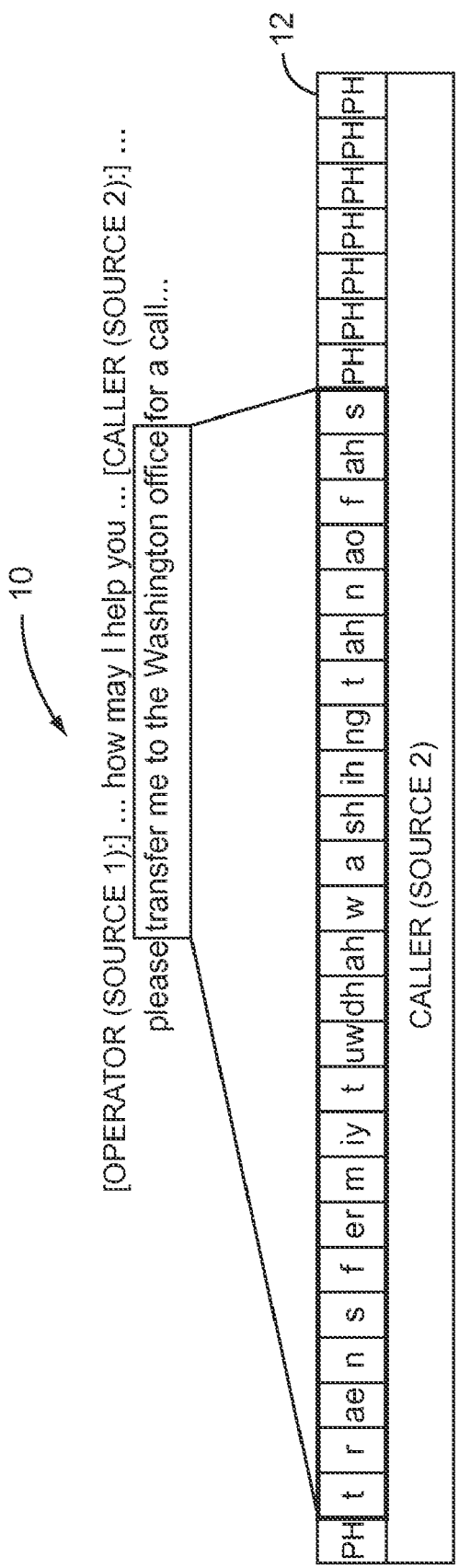
FIG. 2 illustrates the parsing of an audio segment into a sequence of phonemes for a phonetic index according to one embodiment of the present invention

FIG. 2 illustrates the parsing and association process described above. Assume that an audio segment 10 includes interactive speech between two sources. The first source (Source 1) is an operator, and the second source (Source 2) is a caller. Among other speech, assume the operator (Source 1) utters the question "how may I help you?" and in response, the caller (Source 2) utters the response "please transfer me to the Washington office for a call." As the audio segment 10 is parsed into corresponding phonemes, each basic unit of speech is translated into a phoneme (PH). The sequence of phonemes is used to form a corresponding phonetic index 12 and a source of the phonemes is associated with the phonemes of the phonetic index 12. As will be described further below, there are numerous ways to associate a source with a corresponding group of phonemes in the phonetic index 12. With respect to FIG. 2, assume the source of the phonemes is provided in or with the phonetic index 12, which may be associated with the audio segment in a media item or in a separate file or stream, which is associated with the media item containing the audio segment.

A portion of the phonetic index 12 is illustrated, and the actual phonemes for the speech segment corresponding to "transfer me to the Washington office" are provided. Phonemes about this speech segment are illustrated generically as PH. The string of phonemes for the speech segment "transfer me to the Washington office" is represented as follows:

t r ae n s f er m iy t uw dh ah
w a sh ih ng t ah n ao f ah s.

Since the speech segment was uttered by the caller (Source 2), corresponding source information is provided in the phonetic index 12, wherein the phonemes uttered by the caller (Source 2) are associated with the caller (Source 2). Notably, this phonetic example is an over-simplified representation of a typical phonetic index. A phonetic index may include or represent characteristics of the acoustic channel, which represents the environment in which the speech was uttered, and a transducer through which it was recorded, and a natural language in which human beings express the speech. Acoustic channel characteristics include frequency response, background noise, and reverberation. Natural language characteristics include accent, dialect, and gender traits. For basic information on one technique for parsing speech into phonemes, please refer to the phonetic processing technology provided by Nexidia Inc., 3565 Piedmont Road NE, Building Two, Suite 400, Atlanta, Ga. 30305 (www.nexidia.com), and its white paper entitled *Phonetic Search Technology*, 2007 and the references cited therein, wherein the white paper and cited reference are each incorporated herein by reference in their entireties.

As indicated, the phonetic index 12 and associated source information may be directly or indirectly associated with each other in a variety of ways. Regardless of the source information, the phonetic index 12 may also be maintained in a variety of ways. For example, the phonetic index 12 may be associated with the corresponding audio segment in a media item that includes both the audio segment and the phonetic index 12. In one embodiment, the phonetic index 12 may be maintained as metadata associated with the audio segment, wherein the phonetic index 12 is preferably, but need not be, synchronized (or time-aligned) with the audio segment. When synchronized, a particular phoneme is matched to a particular location in the audio segment where the unit of speech from which the phoneme was derived resides. Alternatively, the phonetic index 12 may be maintained in a separate file or stream, which may or may not be synchronized with the audio segment, depending on the application. When there is a need for synchronization, the phonetic index may be associated with a time reference or other synchronization reference with respect to the audio segment or media item containing the audio segment. Notably, certain applications will not require the maintenance of an association between the phonetic index 12 and the audio segment from which the phonetic index 12 was derived. Similarly, the source information may be maintained with the phonetic index 12, in a separate file or stream, or in the media item containing the audio segment. Notably, certain applications will not require the maintenance of an association between the source information and the audio segment from which the phonetic index 12 was derived. FIGS. 3 through 10 illustrate various ways to maintain a phonetic index 12 and associated source information.

Figures 3, 4, 5:
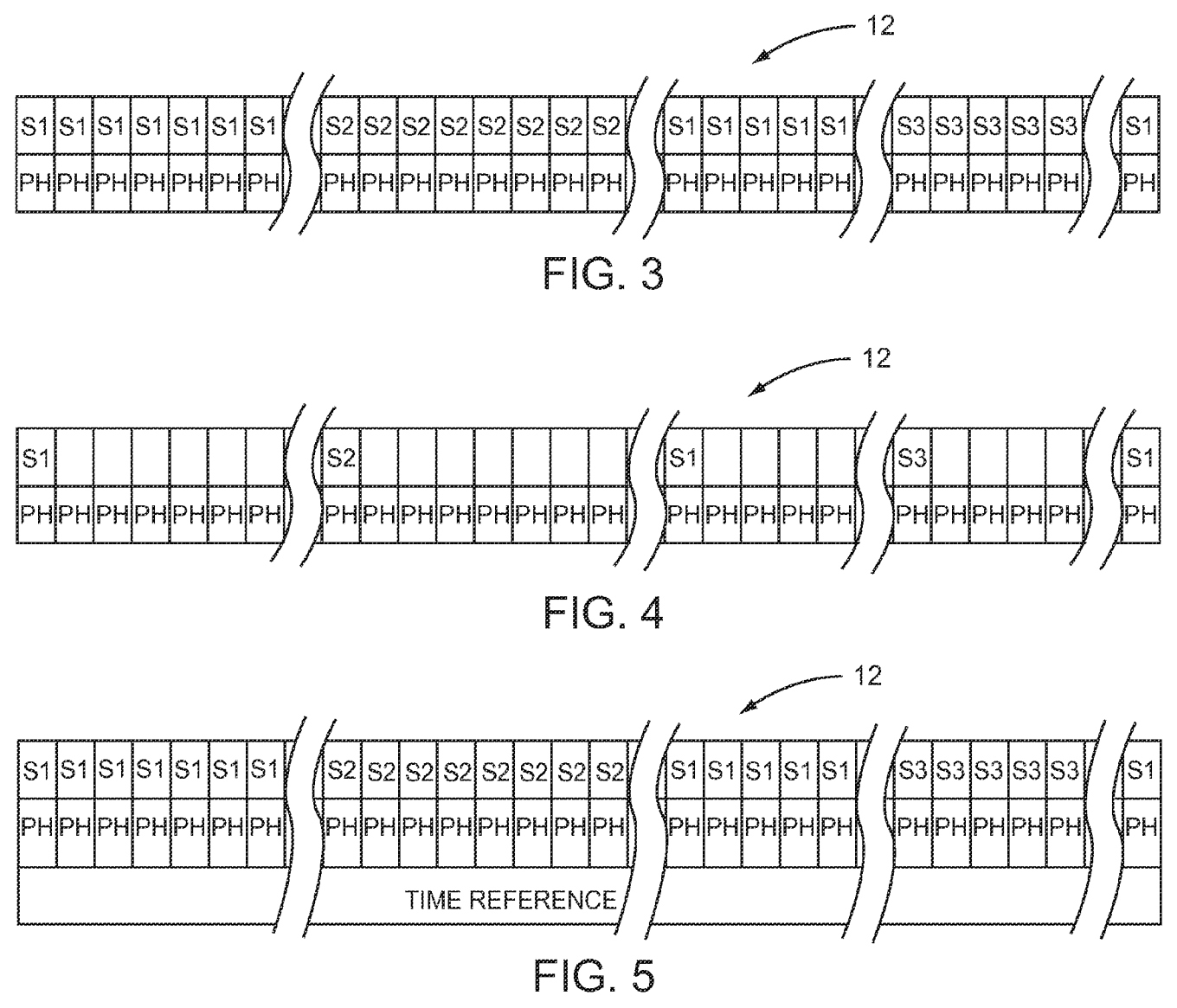

FIG. 3 illustrates an embodiment wherein the phonetic index 12 includes a sequence of phonemes (PH), which correspond to the units of speech in the audio segment, as well as source information for each phoneme (PH). The source information SX, where X represents a particular source of the source information SX, is generally provided for each phoneme. Accordingly, each position of the phonetic index 12 includes a phoneme for a particular unit of speech and the corresponding source for that particular unit of speech. The phonetic index 12 may be provided in a separate media item, such as a file or stream, which may or may not be time-aligned with the corresponding audio segment.

FIG. 4 illustrates a similar embodiment as that illustrated in FIG. 3, with the exception that the source information SX is provided in association with the first phoneme that is associated with a new source. Accordingly, once a particular source SX is identified, the phonemes derived after determining the particular source are associated with that particular source until there is a change to another source. The phonetic index 12 may be provided in a separate media item, such as a file or stream, which may or may not be time-aligned with the corresponding audio segment 10.

FIG. 5 illustrates a phonetic index 12 wherein the source information SX is associated with each phoneme, such as that provided in FIG. 3. In this embodiment, the phonetic index 12 is further associated with a time reference or other synchronization information, which allows a particular phoneme and associated source SX to be correlated to a corresponding location in the audio segment 10. As such, the time reference allows an association between the unit of speech and the audio segment 10 to the corresponding phoneme and source in the phonetic index 12, wherein the audio segment 10 and the phonetic index 12 may be provided in separate files or streams.

Figure 6:
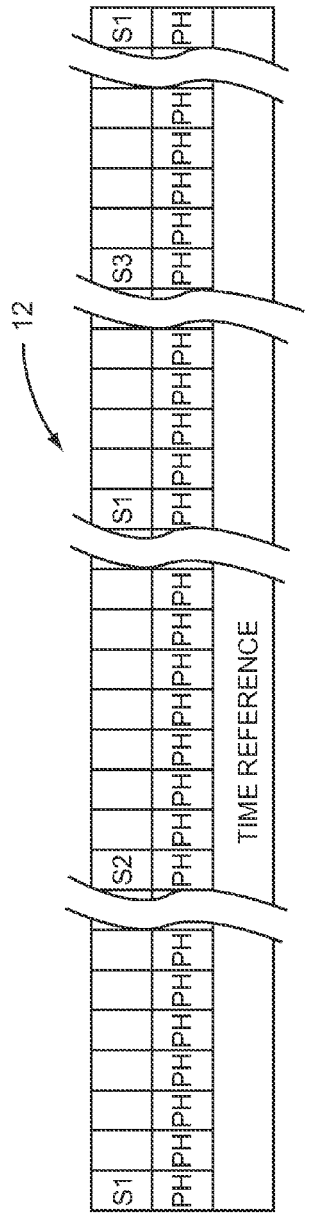

FIG. 6 provides a similar embodiment, wherein the source information provided in the phonetic index 12 identifies the source SX as associated with a particular phoneme, without providing a separate source index position for each corresponding phoneme position, such as that illustrated in FIG. 4. However, the embodiment in FIG. 6 is further associated with a time reference or other synchronization information as illustrated in FIG. 5.

Figure 7:
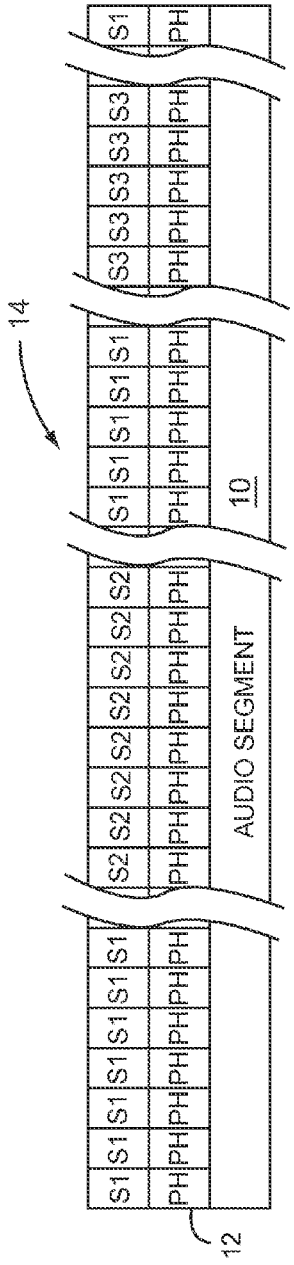
Figure 8:
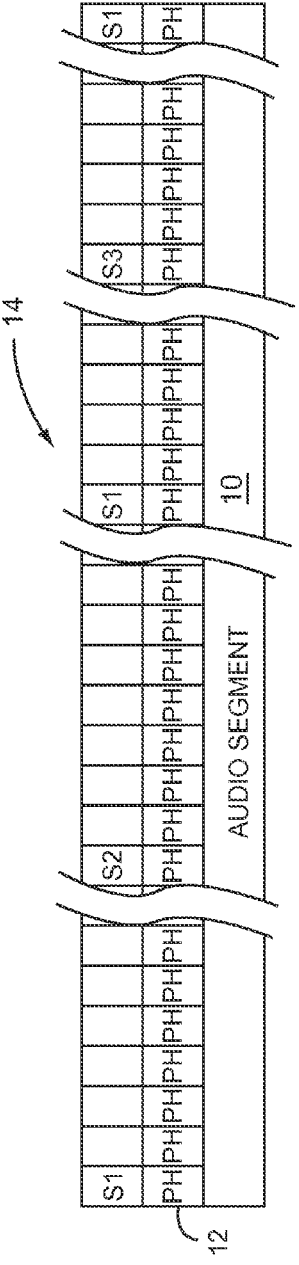

With reference to FIGS. 7 and 8, the phonetic index 12 is stored along with the audio segment 10 and the source information SX in a media item, such as a media file or stream. Notably, the audio segment 10 may be the same as that from which the phonemes were derived or a compressed version thereof. Regardless of the compression or formatting, the content of the audio segment 10 will correspond to the phonetic index 12 that is associated therewith. Further, the phonemes of the phonetic index 12 and the corresponding source information may be provided as metadata associated with the audio segment 10. The source information will be aligned with the corresponding phonemes; however, the phonemes may or may not be synchronized or time-aligned with the audio segment 10, depending on the particular application.

Figure 9:
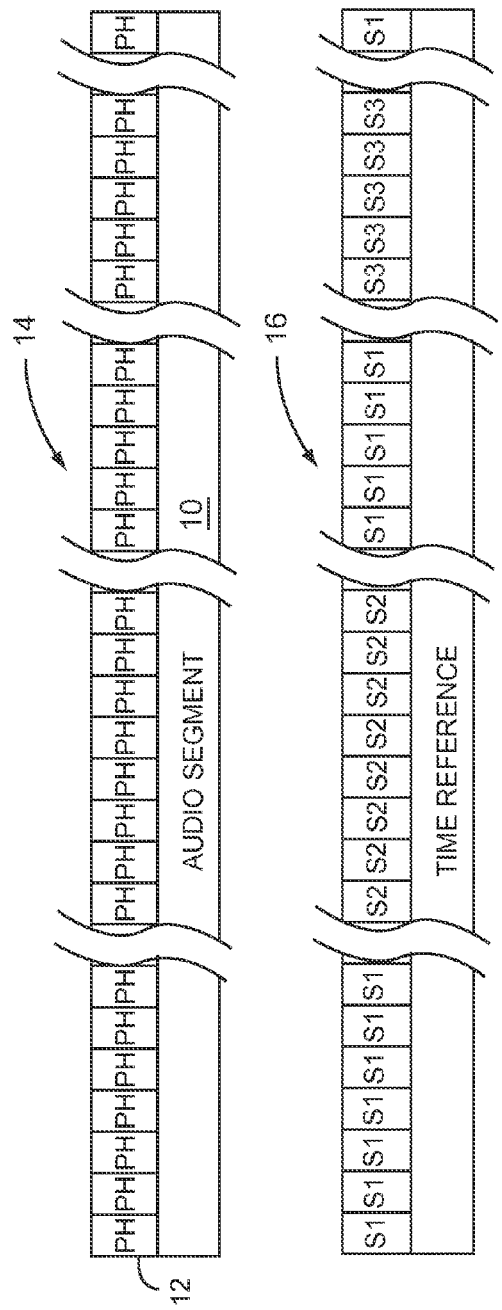

With reference to FIG. 9, a media item 14, which includes the phonetic index 12, is separate from a file or stream that includes a separate source index 16. Accordingly, the source index 16 may be provided in a file that is separate from a file or stream that contains both the phonetic index 12 and the corresponding audio segment 10. In order to synchronize the source information of the source index 16 with the phonemes in the phonetic index 12, synchronization information, such as a time reference, may be provided in association with the source information entries of the source index 16. The time reference or synchronization information will correspond to a time reference or appropriate synchronization reference that is inherent to the audio item 14 or provided therein to facilitate synchronization of the phonetic index 12 and the source index 16.

Figure 10:
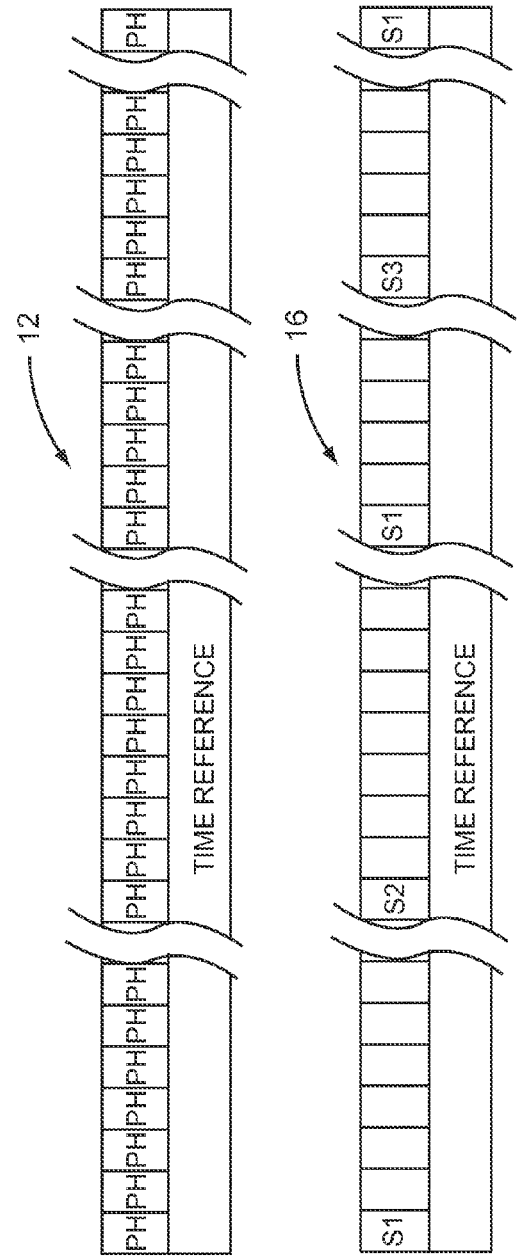

FIG. 10 illustrates an embodiment wherein separate files or streams are used to provide the phonetic index 12 and the source index 16, respectively. In this embodiment, the files for the respective phonetic index 12 and source index 16 may be separate from a file or stream containing the audio segment.

Notably, the phonetic index 12 and the source index 16 may include a time reference or other synchronization information to allow the phonemes of the phonetic index 12 to be associated with a particular source. This time reference or synchronization information may also relate to the audio segment 10 in a separate file or stream, in certain embodiments.

By associating the phonemes with a corresponding source, the phonetic index 12 of speech content from multiple sources may be searched based on the phonetic content, corresponding source, or a combination thereof. Such searches may entail searching the phonetic index 12 based on phonetic content criteria to identify a source associated with the phonetic content, searching the phonetic index 12 based on the phonetic content criteria as well as source criteria to identify a matching location in the phonetic index or corresponding audio segment 10, and the like. Accordingly, the source information that is associated with the phonetic index 12 may be useful as a search criterion or a search result. In one embodiment, a phonetic index 12 and any source information directly or indirectly associated therewith may be searched as follows.

Figure 11:
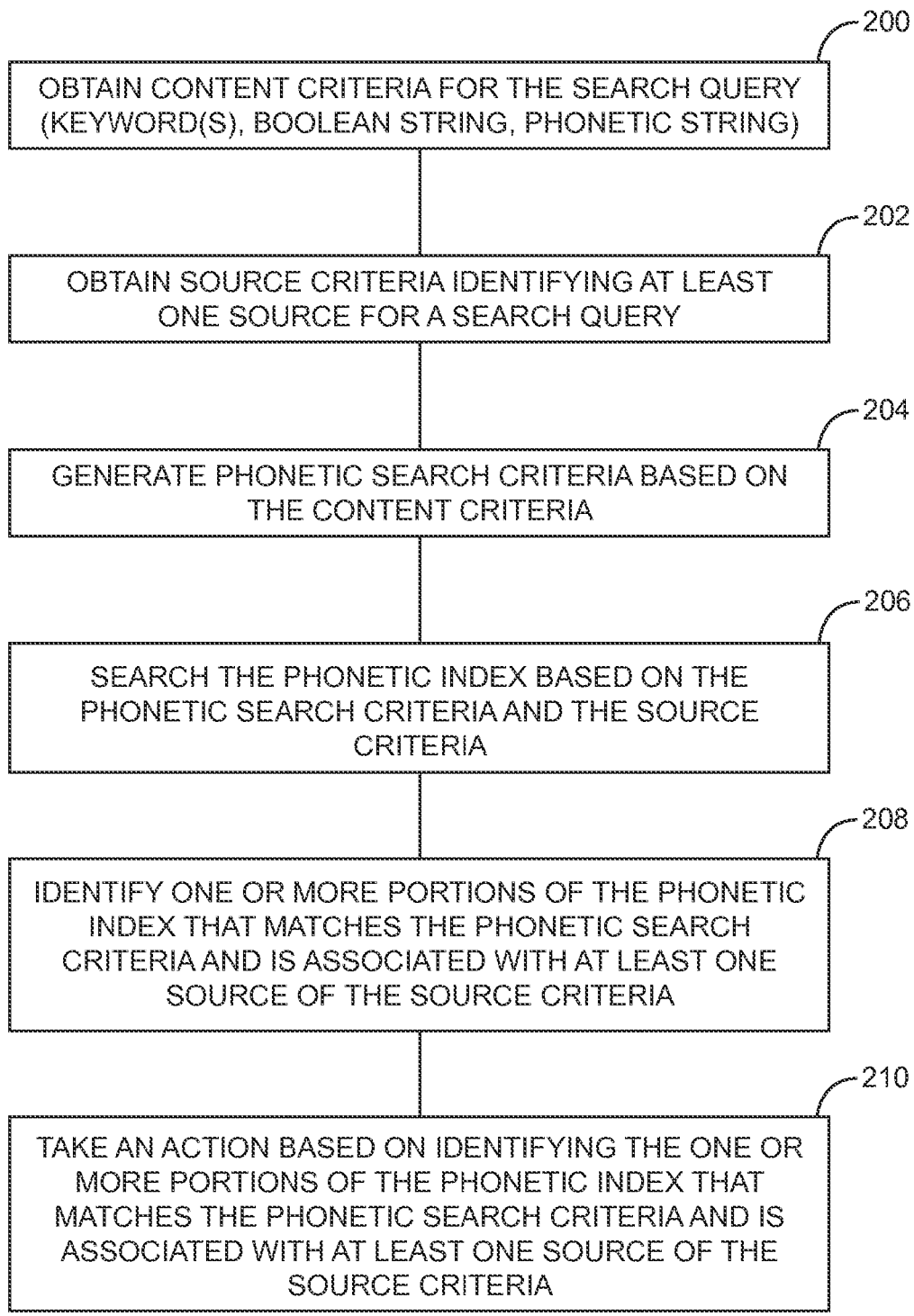
FIG. 11 is a flow diagram illustrating an exemplary technique for searching a phonetic index according to one embodiment of the present invention.
Figure 12B:
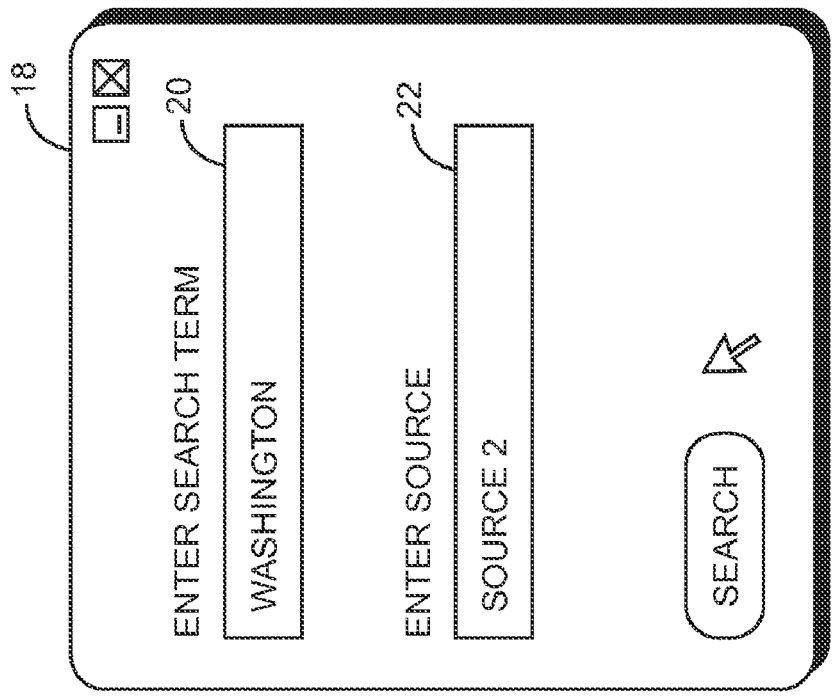
FIGS. 12A and 12B illustrates windows in which content criteria and source criteria may be entered for a search query.
Figure 12A:
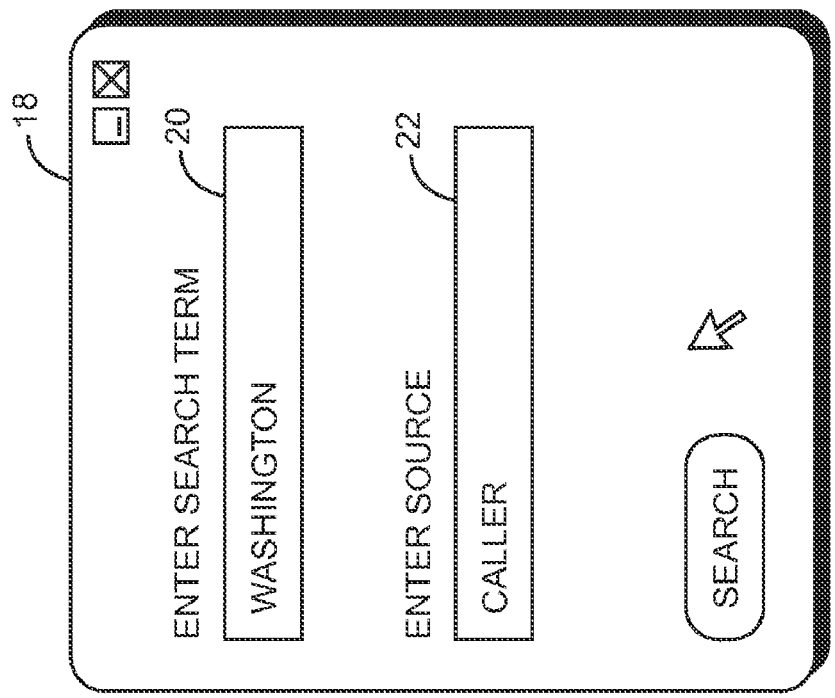
Figure 13:
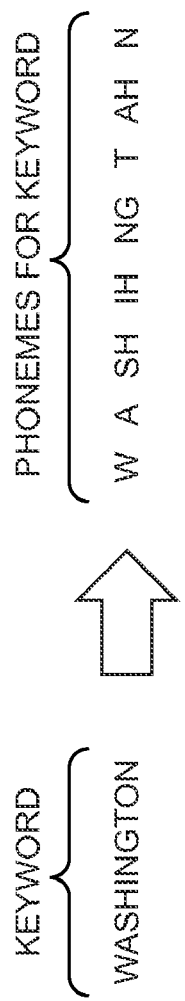
FIG. 13 illustrates the translation of a keyword to a string of phonemes for the keyword.

With reference to FIG. 11, initially, a search query providing content criteria and source criteria is received. The content criteria bear on the desired phonetic content and source criteria bear on the desired source. From the search query, the content criterion and the source criteria is obtained (Steps 200 and 202). FIGS. 12A and 12B illustrate application windows 18 in which a user may provide the content criteria and source criteria for the search query. A content field 20 is provided for entering the content criteria and a source field 22 is provided for entering the source criteria. The content criteria query may include keywords, phoneme strings, or any combination thereof alone or in the form of a Boolean function. In FIG. 12A, the search criterion is a single keyword "Washington." If one or more keywords are used, each keyword or keywords are broken into a phonetic equivalent, which is generally a corresponding string of phonemes and represents phonetic search criteria (Step 204). If the keyword is "Washington," the phonetic search criterion is represented by the phonetic string: w a sh ih ng t ah n, as illustrated in FIG. 13. The user may enter the phonetic equivalent of the keyword instead of the corresponding keyword in the search content field 20, as provide in FIG. 12B. If the phonetic equivalent is provided, the step of generating the phonetic search criterion is not necessary. Notably, a single keyword is used in this example for the sake of clarity, but those skilled in the art will appreciate that more complicated content criteria including multiple keywords and associated Boolean operators may be provided.

Figure 14:
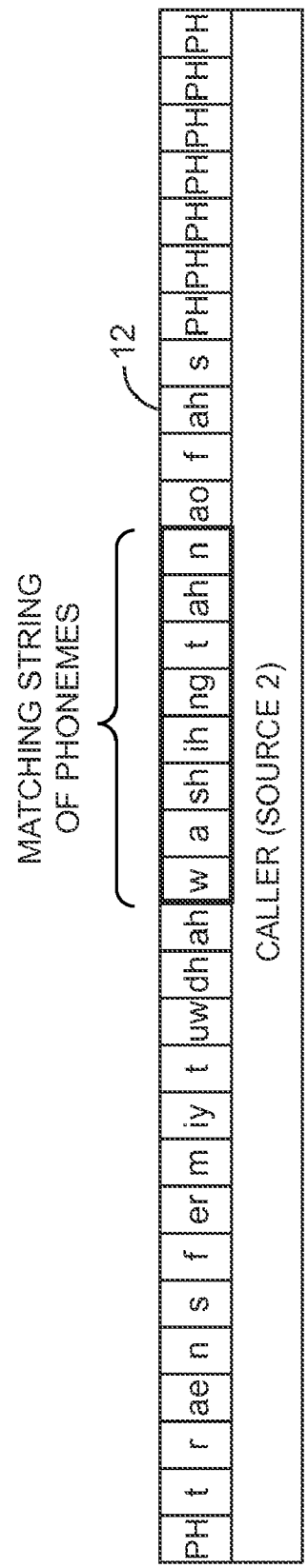
FIG. 14 illustrates matching a string of phonemes within the sequence of phonemes of a phonetic index.

Accordingly, the content criteria either is or is converted to phonetic search criteria comprising one more strings of phonemes, which may be associated with one or more Boolean operators. The phonetic index and associated source information are then searched based on the phonetic content criteria and the source criteria (Step 206) and portions of the phonetic index that match the phonetic search criteria and correspond to the source or sources of source criteria are identified (Step 208), as depicted in FIG. 14. The highlighted section of the phonetic index 12 represents the matching string of phonemes (w a sh ih ng t ah n) for the keyword "Washington." Depending on the application, various actions may be taken in response to identifying those portions of the phonetic index that match the phonetic search criteria and correspond to the source or sources identified by the source criteria (Step 210). Further, such processing and searching may be provided on existing media files or streaming media that has speech content from one or more parties.

The actions taken may range from merely indicating that a match was found to identifying the locations in the phonetic index 12 or audio segment 10 wherein the matches were found. Accordingly, the text about the location of a phonetic match may be provided in a textual format, wherein the phonetic index 12 or other source is used to provide all or a portion of a transcript associated with the phonetic match. Alternatively, the portions of the audio segment that correspond to the phonetic match may be played, queued, or otherwise annotated or identified. In another example, multi-party telephone conversations may be monitored based on keywords alone, and when certain keywords are uttered, alerts are generated to indicate when the keywords were uttered and the party who uttered them. Alternatively, multi-party telephone conversations may be monitored based on keywords as well as source criteria, such that when certain keywords are uttered by an identified party or parties, alerts are generated to indicate when the keywords were uttered by the identified party or parties. The alerts may identify each time a keyword is uttered and identify the party uttering the keyword at any given time, wherein utterances of the keyword by parties that are not identified in the search criteria will not generate an alert. Those skilled in the art will recognize innumerable applications based on the teachings provided herein. Notably, the term "keyword" is generally used to identify any type of syllable search term, sound, phrase, or utterance, as well as any series or string thereof that are associated directly or through Boolean logic.

Figure 15:
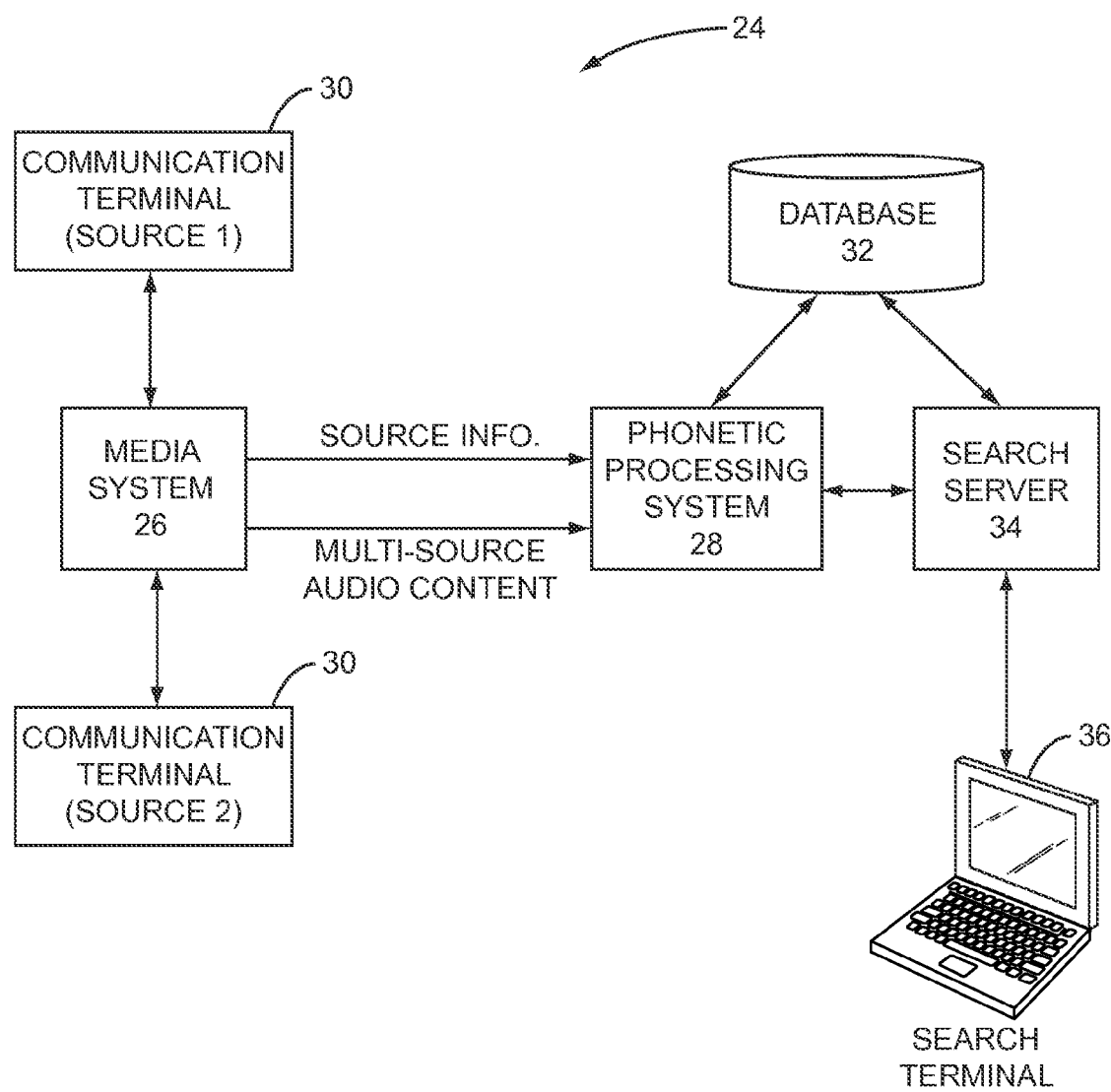
FIG. 15 illustrates a media environment according to one embodiment of the present invention.

With reference to FIG. 15, a media environment 24 in which one embodiment of the present invention may be employed is illustrated. The media environment 24 may include a media system 26 and a phonetic processing system 28. The media system 26 may process any number of media items, which include speech, from any number of sources, such as communication terminals 30. The media system 26 may simply operate to allow various communication terminals 30 to communicate with one another in the case of a communication network or the like. The media system 26 may also represent a service node or like communication processing system, wherein composite speech signals, which include the speech from different sources or parties, are made available alone or in association with other media. As such, the media system 26 may provide multi-source audio content, which includes audio segments that have speech from different sources. In addition, the media system 26 may be able to identify the source that is associated with the various segments of speech in the audio segment. Accordingly, the source information will identify a source for the various speech segments in the multi-source audio content.

The phonetic processing system 28 may provide the functionality described above, and as such, may receive the source information and the multi-source audio content, generate a phonetic index for the multi-source audio content, and associate sources with the phonemes in the phonetic index based on the source information. Notably, the source information may be integrated with or provided separately from the multi-source audio content, depending on the application.

Also illustrated are a database 32, a search server 34, and a search terminal 36, which may also represent a communication terminal 30. The search server 34 will control searching of a phonetic index and any integrated or separate source information as described above, in response to search queries provided by the search terminal 36. Notably, the phonetic processing system 28 may be instructed by the search server 34 to search the incoming multi-source audio content in real time or access phonetic indices 12 that are stored in the database 32. When processing real-time or streaming information, the phonetic processing system 28 may generate the phonetic indices 12 and associated source information, as well as search the phonetic indices 12, the source information, or a combination thereof, in real time. Any search results may be reported to the search server 34 and on to the search terminal 36. Alternatively, the phonetic processing system 28 may generate the phonetic indices 12 and associated source information, and store the phonetic indices 12 and associated source information in the database 32, alone or in association with the multi-source audio content. If stored in the database 32, the search server 34 may access the phonetic indices 12 and associated source information for any number of multi-source audio content and provide search results to the search terminal 36.

Figure 16:
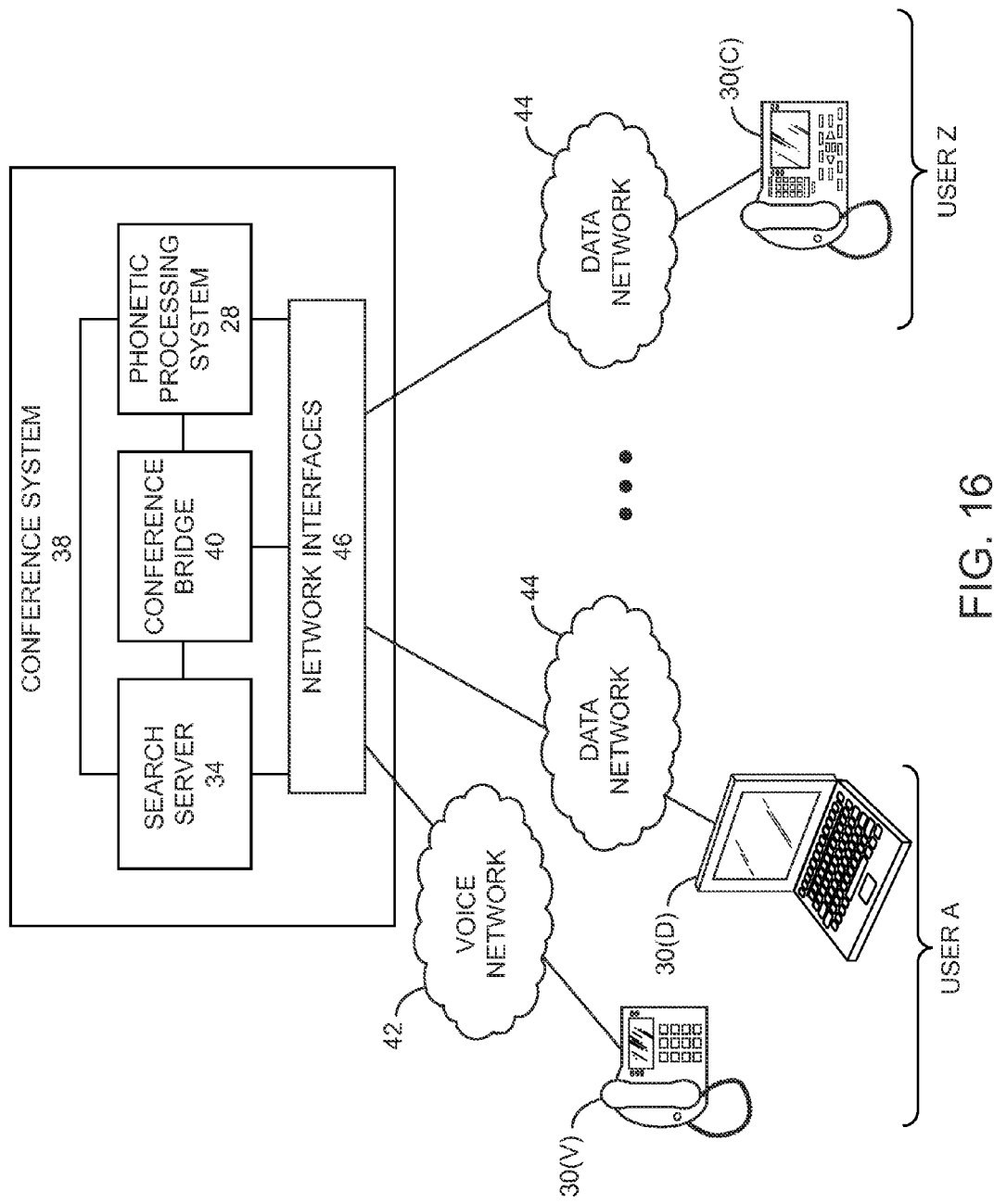
FIG. 16 illustrates a conferencing environment according to one embodiment of the present invention.

The present invention is particularly useful in an audio or video conferencing. An overview of a conference environment in which the present invention may be practiced is provided in association with FIG. 16. As illustrated, a number of communication terminals 30 are in communication with a conference system 38, which has a conference bridge 40. A communication terminal 30 for each of the participants in a conference call is coupled to the conference system 38 through a voice session. The conference system 38 will facilitate the conference call via the various voice sessions in traditional fashion, and may also support associated video conferencing.

The communication terminals are generally referenced with the numeral 30; however, the different types of communication terminals are specifically identified when desired with a letter V, D, or C. In particular, a voice communication terminal 30(V) is primarily configured for voice communications, communicates with the conference system 38 through an appropriate voice network 42, and generally has limited data processing capability. The voice communication terminal 30(V) may represent a wired, wireless, or cellular telephone or the like while the voice network 42 may be a cellular or public switched telephone network (PSTN).

A data communication terminal 30(D) may represent a computer, personal digital assistant, media player, or like processing device that communicates with the conference system 38 over a data network 44, such as a local area network, the Internet, or the like. In certain embodiments, certain users will have a data communication terminal 30(D) and an associated voice communication terminal 30(V). For example, a user may have an office or cellular telephone as well as a personal computer. Alternatively, a composite communication terminal 30(C) supports voice communications as well as sufficient control applications to facilitate interactions with the conference system 38 over the data network 44, as will be described further below. The composite communication terminal 30(C) may be a personal computer that is capable of supporting telephony applications or a telephone capable of supporting computing applications, such as a browser application.

In certain embodiments of the present invention, certain conference participants are either associated with a composite communication terminal 30(C) or both voice and data communication terminals 30(V), 30(D). For a conference call, each participant is engaged in a voice session, or call, which is connected to the conference bridge 40 of the conference system 38 via one or more network interfaces 46. Data or video capable terminals are used for application sharing or video presentation. A session function of the conference system 38 may be used to help facilitate establishment of the voice sessions for the conference call. In particular, the session function may represent call server functionality or like session signaling control function that participates in establishing, controlling, and breaking down the bearer paths or bearer channels for the voice sessions with the conference bridge 40.

In addition to a voice session, a control channel may also be established for each or certain participants. The control channel for each participant is provided between an associated communication terminal 30 and the conference system 38. The control channel may allow a corresponding participant to control various aspects of the conference call, receive information related to the conference call, provide informant related to the conference call, and exchange information with other participants. The control channels may be established with a conference control function, which is operatively associated with the conference bridge 40 and the session control function. For participants using a composite communication terminal 30(C), control channels may be established between the composite communication terminal 30(C) and the conference control function while the voice session is established between the composite communication terminal 30(C) and the conference bridge 40. For participants using voice and data communication terminals 30(V), 30(D), control channels may be established between the data communication terminal 30(D) and the conference control function, while the corresponding voice sessions are established between the voice communication terminals 30(V) and the conference bridge 40.

Although the control channels may take any form, an exemplary control channel is provided by a web session wherein the conference control function runs a web server application and the composite communication terminal 30(C) runs a compatible browser application. The browser application provides a control interface for the associated participant and the web server application will control certain operations of the conference system 30 based on participant input and facilitate interactions with and between the participants.

The conference bridge 40, including the session function and the conference control function, may be associated with the search server 34 and the phonetic processing system 28. As such, keyword or phonetic search queries may be received by the search server 34 from the participants via the control channels, and search results may be provided to the participants via the same control channels. The conference bridge 40 will be able to provide a conference output that represents multi-source audio content and associated source information to the phonetic processing system 28 to facilitate creation of a phonetic index 12 and associated source information for the conference output as well as searching of the phonetic index 12 and the associated source information.

As noted, the conference bridge 40 is used to facilitate a conference call between two or more conference participants who are in different locations. In operation, calls from each of the participants are connected to the conference bridge 40. The audio levels of the incoming audio signals from the different calls are monitored. One or more of the audio signals having the highest audio level are selected and provided to the participants as an output of the conference bridge. The audio signal with the highest audio level generally corresponds to the participant who is talking at any given time. If multiple participants are talking, audio signals for the participant or participants who are talking the loudest at any given time are selected.

The unselected audio signals are generally not provided by the conference bridge to conference participants. As such, the participants are only provided the selected audio signal or signals and will not receive the unselected audio signals of the other participants. To avoid distracting the conference participants who are providing the selected audio signals, the selected audio signals are generally not provided back to the corresponding conference participants. In other words, the active participant in the conference call is not fed back their own audio signal. Those skilled in the art will recognize various ways in which a conference bridge 40 may function to mix the audio signals from the different sources. As the audio levels of the different audio signals change, different ones of the audio signals are selected throughout the conference call and provided to the conference participants as the output of the conference bridge.

Figure 17A:
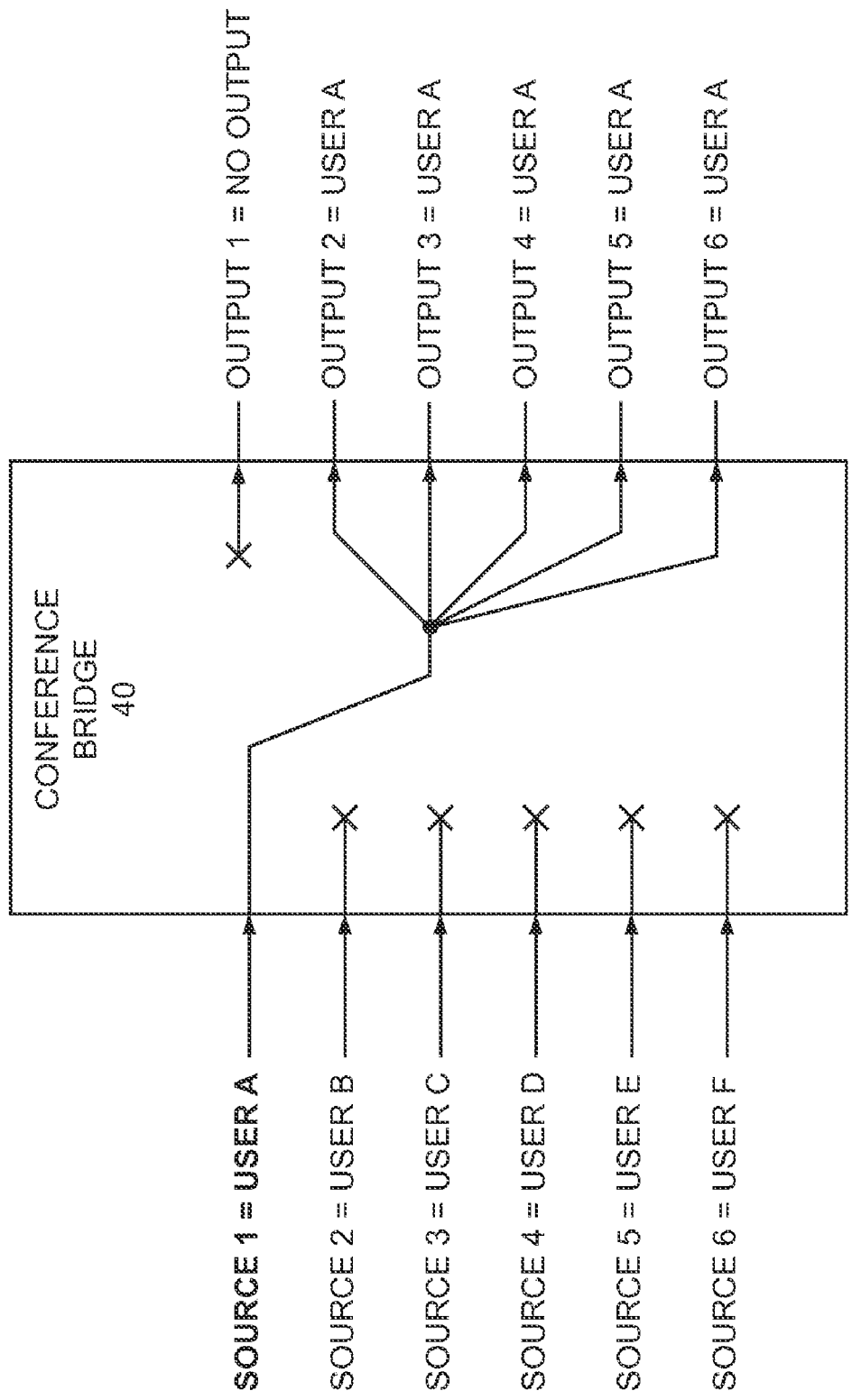
FIGS. 17A and 17B illustrate the basic operation of a conference bridge according to one embodiment of the present invention.
Figure 17B:
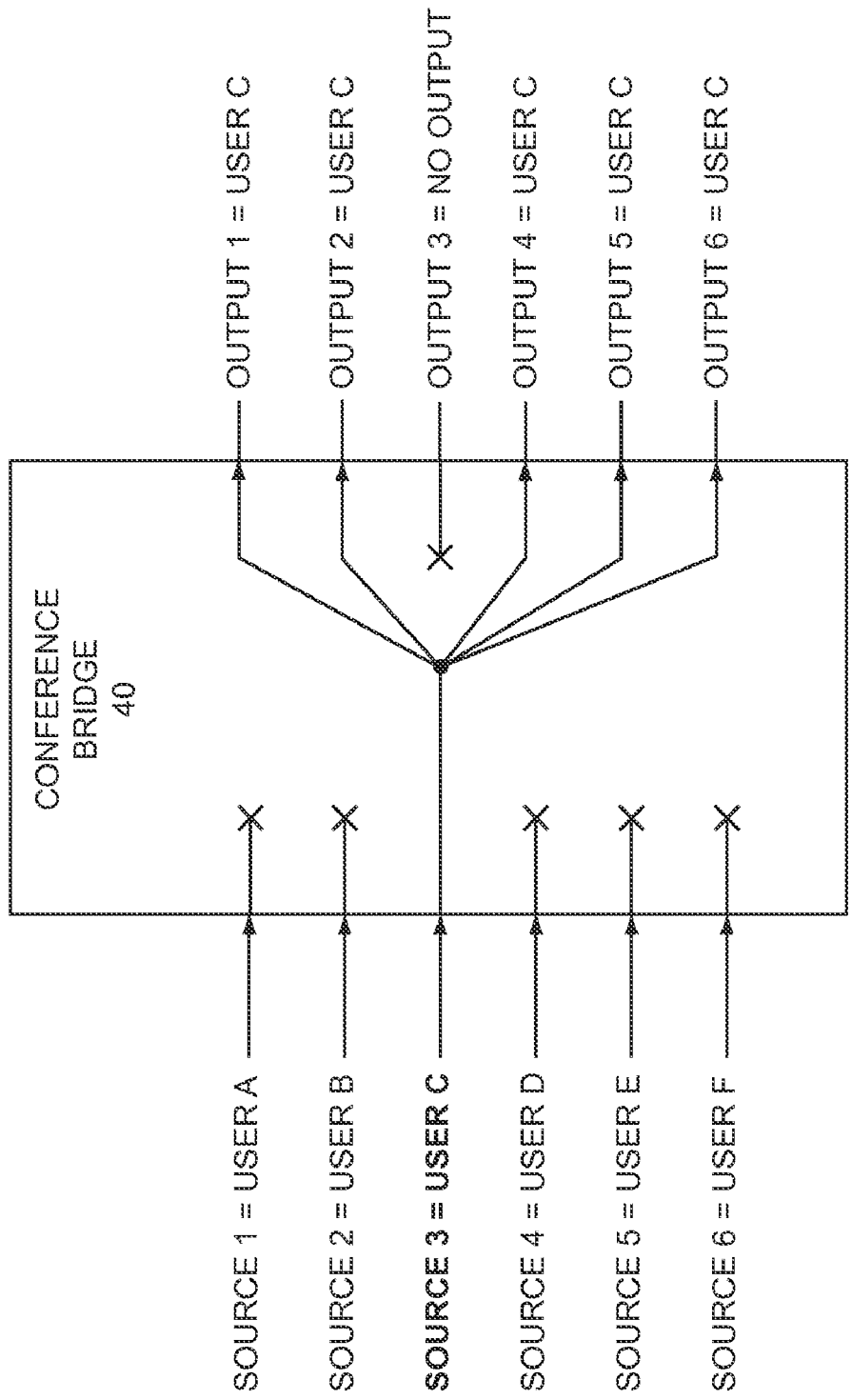

An exemplary embodiment of the conference bridge 40 is now described in association with FIGS. 17A and 17B. With initial reference to FIG. 17A, assume the conference bridge 40 only selects one of the audio signals to provide as an output at any given time during the conference call. As illustrated, the conference bridge 40 receives audio signals for users A through F via source ports, SOURCES 1 through 6, and provides the selected one of the audio signals to users A through F via output ports, OUTPUT 1 through 6. Each voice session is associated with one source port, SOURCE N, that can receive audio signals for a user from a corresponding communication terminal 30 and one output port, OUTPUT N, that can provide the selected audio signal back to that communication terminal 30. For example, assume users A through F are conference participants and are each being served via different voice session, and thus communication terminal 30. Audio signals from users A through F are received at source ports SOURCE 1 through 6, respectively, by the conference bridge 40. Assuming the audio signals from User A are selected to be the output of the conference bridge 40, User A's audio signals are provided to users B through F via output ports OUTPUT 2 through 6, respectively. To avoid distracting User A, User A's audio signals are not provided back to User A via output port OUTPUT 1. The audio signals of the other users B through F are dropped.

With reference to FIG. 17B, assume that User A stops talking and User C begins talking. When User C begins talking, the conference bridge 40 will select the audio signals from User C to be the output of the conference bridge 40. Audio signals from users A through F are still received at source ports SOURCE 1 through 6, respectively. Since the audio signals from User C are selected to be the output of the conference bridge 40, User C's audio signals are provided to users A, B, D, E, and F via output ports OUTPUT 1, 2, 4, 5, and 6, respectively. To avoid distracting User C, User C's audio signals are not provided back to User C via output port OUTPUT 3. The audio signals of the other users A, B, D, E, and F are dropped.

Figure 18:
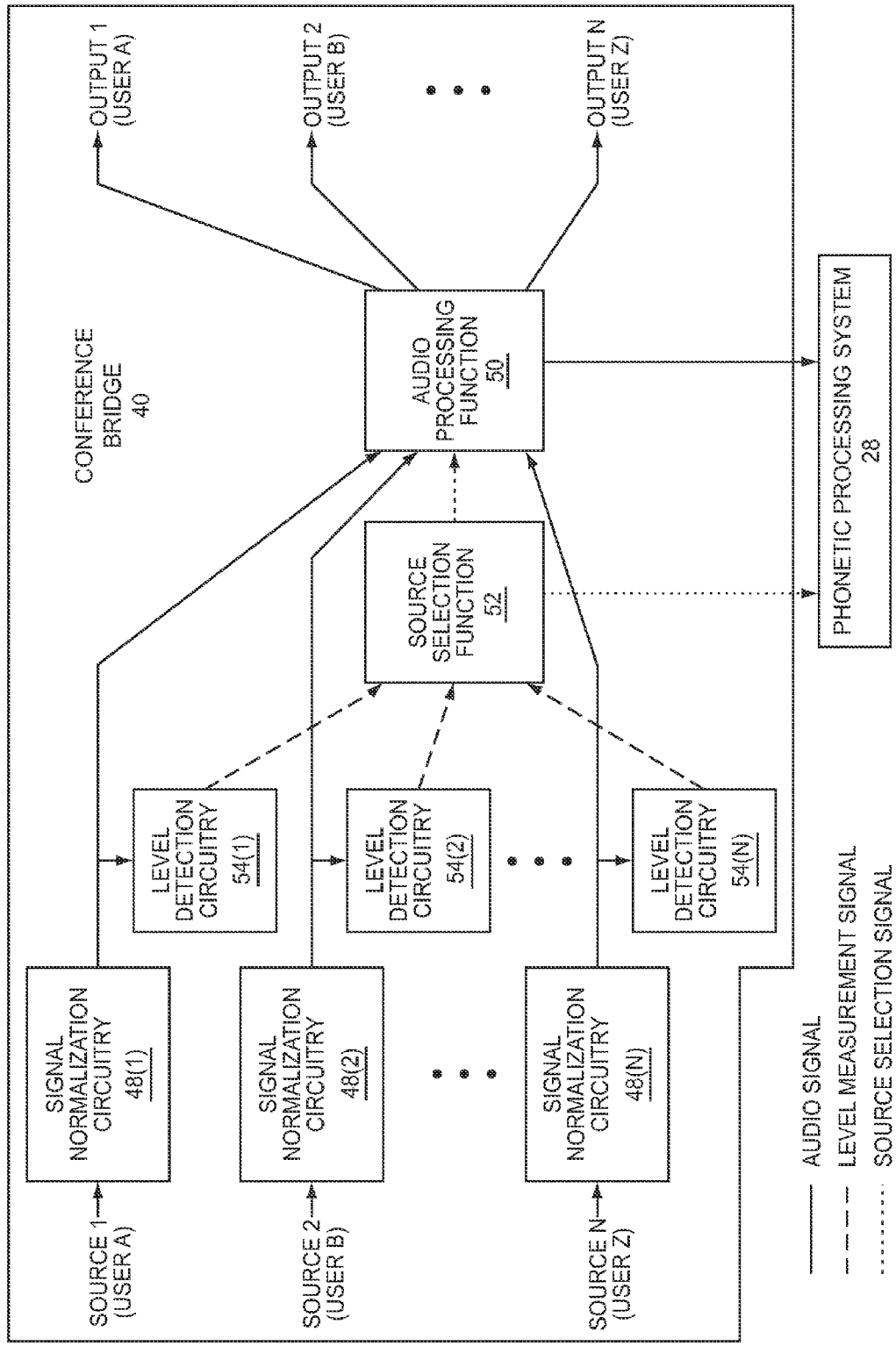
FIG. 18 illustrates a block diagram of a conference bridge according to one embodiment of the present invention.

An exemplary architecture for a conference bridge 40 is provided in FIG. 18. Audio signals are received via source ports, SOURCE 1-N, and processed by signal normalization circuitry 48(1-N). The signal normalization circuitry 48(1-N) may operate on the various audio signals to provide a normalized signal level among the conference participants, such that the relative volume associated with each of the conference participants during the conference call is substantially normalized to a given level. The signal normalization circuitry 48(1-N) is optional, but normally employed in conference bridges 40. After normalization, the audio signals from the various circuitry are sent to an audio processing function 50.

A source selection function 52 is used to select the source port, SOURCE 1-N, which is receiving the audio signals with the highest average level. The source selection function 52 provides a corresponding source selection signal to the audio processing function 50. The source selection signal identifies the source port, SOURCE 1-N, which is receiving the audio signals with the highest average level. These audio signals represent the selected audio signals to be output by the conference bridge 40. In response to the source selection signal, the audio processing function 50 will provide the selected audio signals from the selected source port, SOURCE 1-N from all of the output ports, OUTPUT 1-N, except for the output port that is associated with the selected source port. The audio signals from the unselected source ports SOURCE 1-N are dropped, and therefore not presented to any of the output ports, OUTPUT 1-N, in traditional fashion.

Preferably, the source port SOURCE 1-N providing the audio signals having the greatest average magnitude is selected at any given time. The source selection function 52 will continuously monitor the relative average magnitudes of the audio signals at each of the source ports, SOURCES 1-N, and select appropriate source ports, SOURCE 1-N, throughout the conference call. As such, the source selection function 52 will select different ones of the source ports, SOURCE 1-N, throughout the conference call based on the participation of the participants.

The source selection function 52 may work in cooperation with level detection circuitry 54(1-N) to monitor the levels of audio signals being received from the different source ports, SOURCE 1-N. After normalization by the signal normalization circuitry 48(1-N), the audio signals from source ports, SOURCE 1-N are provided to the corresponding level detection circuitry 54(1-N). Each level detection circuitry 54(1-N) will process corresponding audio signals to generate a level measurement signal, which is presented to the source selection function 52. The level measurement signal corresponds to a relative average magnitude of the audio signals that are received from a given source port, SOURCE 1-N. The level detection circuitry 54(1-N) may employ different techniques to generate a corresponding level measurement signal. In one embodiment, a power level derived from a running average of given audio signals or an average power level of audio signals over a given period of time is generated and represents the level measurement signal, which is provided by the level detection circuitry 54 to the source selection function 52. The source selection function 52 will continuously monitor the level measurement signals from the various level detection circuitry 54(1-N) and select one of the source ports, SOURCE 1-N, as a selected source port based thereon. As noted, the source selection function 52 will then provide a source selection signal to identify the selected source port SOURCE 1-N to the audio processing function 50, which will deliver the audio signals received at the selected source port, SOURCE 1-N, from the different output ports, OUTPUT 1-N, which are associated with the unselected source ports, SOURCE 1-N.

The source selection function 52 may also provide source selection signals that identify the active source port, SOURCE 1-N, at any given time to the phonetic processing system 28. Further, the audio processing function 50 may provide the audio signals from the selected source port, SOURCE 1-N, to the phonetic processing system 28. The phonetic processing system may generate a phonetic index 12 of phonemes for the audio signals. As the selected source ports, SOURCE 1-N, change throughout the conference call, the sources of the audio signals provided to the phonetic processing system 28 change, wherein the audio signals provide multi-source audio content. The multi-source audio content effectively includes a series of speech segments from different source ports, SOURCE 1-N. Since the source selection signals identify the active source port, SOURCE 1-N, at any given time, the phonetic processing system 28 can associate a particular source port, SOURCE 1-N, with a corresponding speech segment in the multi-source audio content, and in particular, the particular section or phonemes of the phonetic index 12 that corresponds to the speech segment.

The phonetic index 12 and associated source information may be monitored in real time or may be stored for subsequent processing. When processed in real time, search queries may be employed to identify utterances by certain parties or sources, and appropriate action may be taken. The actions may include providing an alert via a control channel or other mechanism to the speaking party or the other parties, based on rules established by the speaking party or other parties. As such, the speaking party may establish rules to alert himself or other parties when the speaking party utters a certain keyword or phrase. Alternatively, a first party may establish criteria wherein they are alerted when one or more selected parties utter a certain keyword or phrase. Further, a person who is not a party to the conference call may monitor the conference call and receive alerts when a keyword is uttered. The alert may include the utterance and the source of the utterance. Alternatively, criteria may be employed wherein alerts are provided to a person who is not participating in the conference call when only selected parties utter certain keywords or phrases. Similar processing may be provided on audio files of a conference call, after the conference call has concluded. With the present invention, multiple conference calls may be analyzed at the same time, in real time or after the conference call has concluded. Accordingly, search criteria may be employed to search multiple media items based on content, source, or a combination thereof in an effective and efficient manner according to the present invention.

Figure 19:
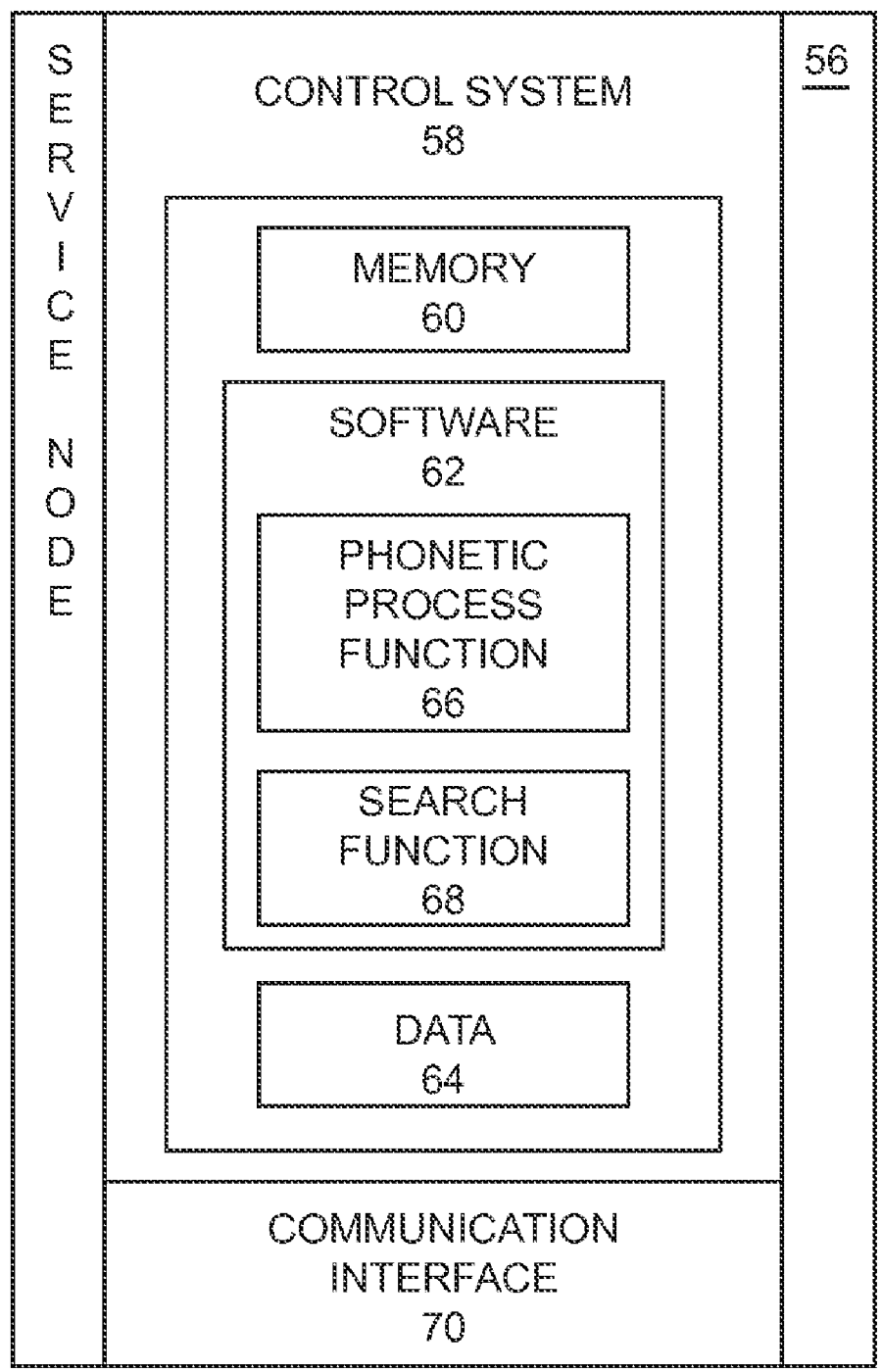
FIG. 19 illustrates a service node according to one embodiment of the present invention.

With reference to FIG. 19, a block representation of a service node 56 is illustrated according to one embodiment of the present invention. The service node 56 may be employed to provide or represent all or a portion of one or more of the following: a conference bridge 40, a search server 34, a phonetic processing system 28, a media system 26, or the like. In general, the service node 56 will include a control system 58 having sufficient memory 60 for the requisite software 62 and data 64 to operate as described above. The software 62 may include any number of functions, such as a phonetic processing function 66 and a search function 68. These functions may provide the functionality of the phonetic processing system 28 and the search server 34, respectively, alone or in combination. The control system 58 may also be associated with a communication interface 70, which facilitates communications with the various entities in the media environment 24, or an appropriate conference environment.

Those skilled in the art will recognize improvements and modifications to the preferred embodiments of the present invention. All such improvements and modifications are considered within the scope of the concepts disclosed herein and the claims that follow.

What is claimed is:

1. A method comprising:
    accessing an audio segment comprising speech content from a plurality of sources, wherein different speech segments of the speech content correspond to different ones of the plurality of sources;
    parsing the speech content into a sequence of phonemes wherein each phoneme corresponds to a basic unit of speech of the speech content;
    generating a phonetic index from the sequence of phonemes; and
    associating a corresponding one of the plurality of sources with phonemes in the sequence of phonemes of the phonetic index such that a source associated with a given phoneme or group of phonemes in the sequence of phonemes of the phonetic index is ascertainable.

2. The method of claim 1 wherein source information identifying the corresponding ones of the plurality of sources with the phonemes in the sequence of phonemes is provided in the phonetic index.

3. The method of claim 2 wherein the phonetic index comprises synchronization information sufficient to align the phonemes in the sequence of phonemes with corresponding basic units of speech in the speech content of the audio segment.

4. The method of claim 3 wherein the synchronization information is a time reference that aligns the phonemes of the sequence of phonemes in time with the corresponding units of speech in the speech content of the audio segment.

5. The method of claim 2 wherein the phonetic index is maintained in a data entity that does not include the audio segment.

6. The method of claim 2 wherein the phonetic index is maintained in a media item that also includes the audio segment or a version of the audio segment.

7. The method of claim 6 wherein the phonemes in the sequence of phonemes and the associated source information is time aligned with the audio segment, such that the phonemes of the sequence of phonemes are aligned in time with the corresponding units of speech in the speech content of the audio segment.

8. The method of claim 2 wherein the source information identifies one of the plurality of sources for each of the phonemes in the sequence of phonemes of the phonetic index.

9. The method of claim 2 wherein different groups of phonemes of the phonetic index correspond to the different speech segments, and the source information identifies one of the plurality of sources for each group of the different groups of phonemes.

10. The method of claim 1 wherein source information identifying the corresponding ones of the plurality of sources with the phonemes in the sequence of phonemes is provided in a separate file or stream than the phonetic index.

11. The method of claim 1 further comprising receiving a media item containing the audio segment and receiving source indicia identifying a source from the plurality of sources for each of the different speech segments of the speech content in the audio segment, wherein the source indicia is used to associate the corresponding one of the plurality of sources with phonemes in the sequence of phonemes of the phonetic index.

12. The method of claim 11 wherein the media item is a media stream.

13. The method of claim 1 wherein the audio segment is a telephony audio signal and the different speech segments correspond to speech from different telephony sources or telephony parties.

14. The method of claim 13 wherein the telephony audio signal is an output of an audio conference bridge and the different speech segments correspond to speech from the different telephony sources or the telephony parties who are connected by the audio conference bridge.

15. The method of claim 14 further comprising:
    providing the audio conference bridge to support audio conferencing of the different telephony sources or the telephony parties; and
    providing the audio segment as the output of the conference bridge.

16. The method of claim 1 further comprising:
    providing at least one phonetic search criterion in association with a search query wherein the phonetic search criterion corresponds to phonetic content;

identifying a matching portion of the phonetic index that meets the at least one phonetic search criterion; and taking an action in response to identifying the matching portion of the phonetic index.

17. The method of claim 16 further comprising providing source criteria identifying at least one source of the plurality of sources in association with the search query, and wherein identifying the matching portion of the phonetic index comprises identifying the matching portion of the phonetic index that meets the at least one phonetic search criterion and the source criteria in light of the association of the corresponding one of the plurality of sources with the phonemes in the sequence of phonemes, such that the matching portion of the phonetic index corresponds to a source identified by the source criteria.

18. The method of claim 16 wherein the action comprises providing a notification that identifies the matching portion of the phonetic index.

19. The method of claim 1 further comprising:
providing source criteria identifying at least one source of the plurality of sources;
identifying a matching portion of the phonetic index that meets the source criteria in light of the association of the corresponding one of the plurality of sources with the phonemes in the sequence of phonemes; and
taking an action in response to identifying the matching portion of the phonetic index.

20. A method comprising:
accessing a phonetic index of a sequence of phonemes and associated source information wherein:
each phoneme in the phonetic index corresponds to a basic unit of speech content of an audio segment comprising speech content from a plurality of sources, such that different speech segments of the speech content correspond to different ones of the plurality of sources; and
the source information associates a corresponding one of the plurality of sources with the phonemes in the sequence of phonemes of the phonetic index;
determining at least one phonetic search criterion in association with a search query wherein the phonetic search criterion corresponds to phonetic content;
identifying a matching portion of the phonetic index that meets the at least one phonetic search criterion; and
taking an action in response to identifying the matching portion of the phonetic index.

21. The method of claim 20 further comprising determining source criteria identifying at least one source of the plurality of sources in association with the search query, and wherein identifying the matching portion of the phonetic index comprises identifying the matching portion of the phonetic index that meets the at least one phonetic search criterion and the source criteria in light of the source information, such that the matching portion of the phonetic index corresponds to a source identified by the source criteria.

22. The method of claim 20 wherein the action comprises providing a notification that identifies the matching portion of the phonetic index.

23. The method of claim 20 wherein the phonetic search criterion comprises a string of phonemes.

24. The method of claim 20 further comprising receiving a search query comprising at least one keyword, and wherein determining the at least one phonetic search criterion comprises translating the at least one keyword into a string of phonemes that is phonetically equivalent to the at least one keyword to provide the at least one phonetic search criterion.

25. The method of claim 20 wherein the audio segment is a telephony audio signal of a conference call, and the different speech segments correspond to speech from different telephony sources or telephony parties associated with the conference call.

26. The method of claim 20 wherein the audio segment is a telephony audio signal and the different speech segments correspond to speech from different telephony sources or telephony parties.

27. The method of claim 26 wherein the telephony audio signal is an output of an audio conference bridge and the different speech segments correspond to speech from the different telephony sources or the telephony parties who are connected by the audio conference bridge.

28. The method of claim 26 wherein taking the action comprises providing an alert to at least one of the different telephony sources or the telephony parties.

29. The method of claim 26 wherein taking the action comprises providing an alert to a person or entity other than the different telephony sources or the telephony parties.

30. The method of claim 20 wherein taking the action comprises identifying a portion of the audio content that corresponds to the matching portion of the phonetic index.

31. A system comprising:
at least one communication interface; and
a control system associated with the at least one communication interface and adapted to:
access an audio segment comprising speech content from a plurality of sources wherein different speech segments of the speech content correspond to different ones of the plurality of sources;
parse the speech content into a sequence of phonemes wherein each phoneme corresponds to a basic unit of speech of the speech content;
generate a phonetic index from the sequence of phonemes; and
associate a corresponding one of the plurality of sources with phonemes in the sequence of phonemes of the phonetic index such that a source associated with a given phoneme or group of phonemes in the sequence of phonemes of the phonetic index is ascertainable.

* * * * *